(12) United States Patent
Wu et al.

(10) Patent No.: US 11,223,649 B2
(45) Date of Patent: Jan. 11, 2022

(54) USER-ADDED-VALUE-BASED RANSOMWARE DETECTION AND PREVENTION

(71) Applicant: NEC Laboratories America, Inc., Princeton, NJ (US)

(72) Inventors: Zhenyu Wu, Plainsboro, NJ (US); Yue Li, Williamsburg, VA (US); Junghwan Rhee, Princeton, NJ (US); Kangkook Jee, Princeton, NJ (US); Zichun Li, Princeton, NJ (US); Jumpei Kamimura, South Brunswick, NJ (US); LuAn Tang, Pennington, NJ (US); Zhengzhang Chen, Princeton Junction, NJ (US)

(73) Assignee: NEC Corporation

( * ) Notice: Subject to any disclaimer, the term of this patent is extended or adjusted under 35 U.S.C. 154(b) by 470 days.

(21) Appl. No.: 16/379,024

(22) Filed: Apr. 9, 2019

(65) Prior Publication Data

US 2019/0342330 A1 Nov. 7, 2019

Related U.S. Application Data

(60) Provisional application No. 62/667,526, filed on May 6, 2018, provisional application No. 62/715,307, filed on Aug. 7, 2018.

(51) Int. Cl.
*H04L 29/06* (2006.01)
*G06F 16/901* (2019.01)
*G06F 11/34* (2006.01)

(52) U.S. Cl.
CPC ...... *H04L 63/1466* (2013.01); *G06F 11/3438* (2013.01); *G06F 16/9024* (2019.01); *H04L 63/1416* (2013.01); *H04L 63/1425* (2013.01)

(58) Field of Classification Search
CPC ............. H04L 63/1466; H04L 63/1416; H04L 63/1425; G06F 16/9024; G06F 11/3438
See application file for complete search history.

(56) References Cited

U.S. PATENT DOCUMENTS

| | | | |
|---|---|---|---|
| 9,317,686 B1 | 4/2016 | Ye et al. | |
| 9,460,284 B1 | 10/2016 | Hajmasan et al. | |
| 9,514,309 B1 | 12/2016 | Mann | |
| 9,734,337 B1* | 8/2017 | Patton | G06F 21/566 |
| 9,756,061 B1* | 9/2017 | Roeh | H04L 63/1425 |
| 9,888,032 B2* | 2/2018 | Dekel | H04L 63/145 |
| 10,229,269 B1* | 3/2019 | Patton | G06F 21/602 |
| 2011/0023115 A1* | 1/2011 | Wright | G06F 21/552 726/22 |
| 2014/0325654 A1 | 10/2014 | Denis | |
| 2016/0323316 A1 | 11/2016 | Kolton et al. | |

(Continued)

*Primary Examiner* — Shin-Hon (Eric) Chen
(74) *Attorney, Agent, or Firm* — Joseph Kolodka (57) ABSTRACT

A method for ransomware detection and prevention includes receiving an event stream associated with one or more computer system events, generating user-added-value knowledge data for one or more digital assets by modeling digital asset interactions based on the event stream, including accumulating user-added-values of each of the one or more digital assets, and detecting ransomware behavior based at least in part on the user-added-value knowledge, including analyzing destruction of the user-added values for the one or more digital assets.

12 Claims, 8 Drawing Sheets

(56) References Cited

U.S. PATENT DOCUMENTS

| | | |
|---|---|---|
| 2016/0337390 A1 | 11/2016 | Sridhara et al. |
| 2016/0378988 A1 | 12/2016 | Bhashkar et al. |
| 2017/0034189 A1 | 2/2017 | Powell |
| 2017/0091453 A1 | 3/2017 | Cochin |
| 2017/0140156 A1 | 5/2017 | Gu et al. |
| 2017/0142140 A1* | 5/2017 | Muddu ............... H04L 63/1441 |
| 2017/0177867 A1 | 6/2017 | Crofton et al. |
| 2017/0180394 A1* | 6/2017 | Crofton ................ G06F 21/64 |
| 2017/0206353 A1 | 6/2017 | Jai et al. |
| 2017/0223031 A1 | 8/2017 | Gu et al. |
| 2017/0308711 A1 | 10/2017 | Barak |
| 2017/0364681 A1* | 12/2017 | Roguine ............... G06F 21/568 |
| 2017/0366563 A1 | 12/2017 | Volfman et al. |
| 2018/0007069 A1 | 1/2018 | Hunt et al. |
| 2018/0018458 A1 | 1/2018 | Schmugar et al. |
| 2018/0146009 A1* | 5/2018 | Primm ................ H04L 63/1491 |
| 2019/0332769 A1* | 10/2019 | Fralick ................ G06F 21/566 |

* cited by examiner

USER-ADDED-VALUE-BASED RANSOMWARE DETECTION AND PREVENTION

RELATED APPLICATION INFORMATION

This application claims priority to provisional application Ser. No. 62/667,526, filed on May 6, 2018, and provisional application Ser. No. 62/715,307, filed on Aug. 7, 2018, both incorporated by reference herein in their entirety.

BACKGROUND

Technical Field

The present invention relates to computer security, and more particularly to ransomware detection and prevention.

Description of the Related Art

Malicious software, or malware, is software designed to cause damage to a computer, server, client or network. Ransomware is a type of malware that threatens to take an action against a user based on the user's digital assets (files, folders, etc.), such as by publishing digital assets, blocking access to digital assets, destroying digital assets and/or denying normal device utilization (e.g., interfering with user interface or interactions), unless a ransom payment is made to the attacker. Ransomware detection generally falls into the following two categories: (1) signature detection and (2) process behavior anomaly detection. Signature detection is an extension of traditional anti-virus and network intrusion detection. Process behavior anomaly detection category can include techniques that can detect the presence of ransomware by comparing normal behavior with malicious behavior.

SUMMARY

According to an aspect of the present invention, a method for ransomware detection and prevention is provided. The method includes receiving an event stream associated with one or more computer system events, generating user-added-value knowledge data for one or more digital assets by modeling digital asset interactions based on the event stream, including accumulating user-added-values of each of the one or more digital assets, and detecting ransomware behavior based at least in part on the user-added-value knowledge, including analyzing destruction of the user-added values for the one or more digital assets.

In accordance with another embodiment of the present invention, a system for ransomware detection and prevention is provided. The system includes a memory device for storing program code and at least one processor operatively coupled to the memory device. The at least one processor is configured to execute program code stored on the memory device to receive an event stream associated with one or more computer system events, generate user-added-value knowledge data for one or more digital assets by modeling digital asset interactions based on the event stream by accumulating user-added-values of each of the one or more digital assets, and detect ransomware behavior based at least in part on the user-added-value knowledge by analyzing destruction of the user-added values for the one or more digital assets.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The embodiments described herein provide for systems and methods that can detect ransomware activity and provide protection for digital assets with high-user-added-value against ransomware activity. More specifically, the embodiments described herein can apply pervasive and continuous monitoring of daily computing activities using local device agents across an enterprise to differentiate user-added-values associated with respective ones of the digital assets. The monitored data can be used to derive the user-added-values of digital assets, based on how a user interacts with the digital assets (e.g., intensity, duration and persistency), using heuristics such as, e.g., machine learning and domain knowledge injections. The embodiments described herein can use the local device agents to detect ransomware activity based on the demolition of user-added-value of all digital assets over the enterprise. By detecting ransomware activity in this manner, the embodiments described herein can thwart divide-and-conquer evasions of process-based detection schemes, by which ransomware can attempt to create many unique processes that can each perform a small number of operations.

In addition to digital asset interaction monitoring, the embodiments described herein can detect ransomware activity by monitoring key events when a digital asset is being demolished, such as by, e.g., deletion, overwriting, etc. For prevention, when potential ransomware activity is detected, the embodiments described herein can pause operations that could further destroy more high-value digital assets, and can signal users and/or administrators for further investigations or decisions. The protection can take place on the file system level, instead of on the individual process-level, with the benefit of more comprehensive protection (e.g., some ransomware can be designed to create alternative responses in response to detecting a paused or killed process). Such protection does not preclude other means of additional protection including, but not limited to, process-level containment, backup data recovery, etc.

For example, the embodiments described herein can illustratively protect digital assets including interactively generated data. In contrast to other types of data such as, e.g., unanimous read-only data that is pre-existing or copied from sources (e.g., operating system files and software libraries), and programmatically generated data (e.g., log files and browser cache data), interactively generated data can accumulate and concentrate user-added-value through prolonged and/or intensive human interactions, and can represent the most valuable types of digital assets in a computer system. Thus, unanimous read-only data and programmatically generated data generally have much lower user-added-value as compared to interactively generated data, and the recovery of such unanimous read-only data and programmatically generated data can be relatively swift and low-cost (e.g. by reinstalling the OS/application and/or tolerating the loss of log files/cache data). Accordingly, the embodiments described herein can protect high user-added-value digital assets (e.g., interactively generated data) from being lost or destroyed as a result of ransomware activities, thereby avoiding potentially major interruptions of enterprise activities.

By monitoring and learning intrinsic activities of an enterprise, a "strategic map" of the valuable digital assets of the enterprise can be obtained in accordance with the embodiments described herein, which ransomware writers are likely not knowledgeable about. Accordingly, the detection and protection techniques described herein can be highly targeted and sensitive.

Figure 1:
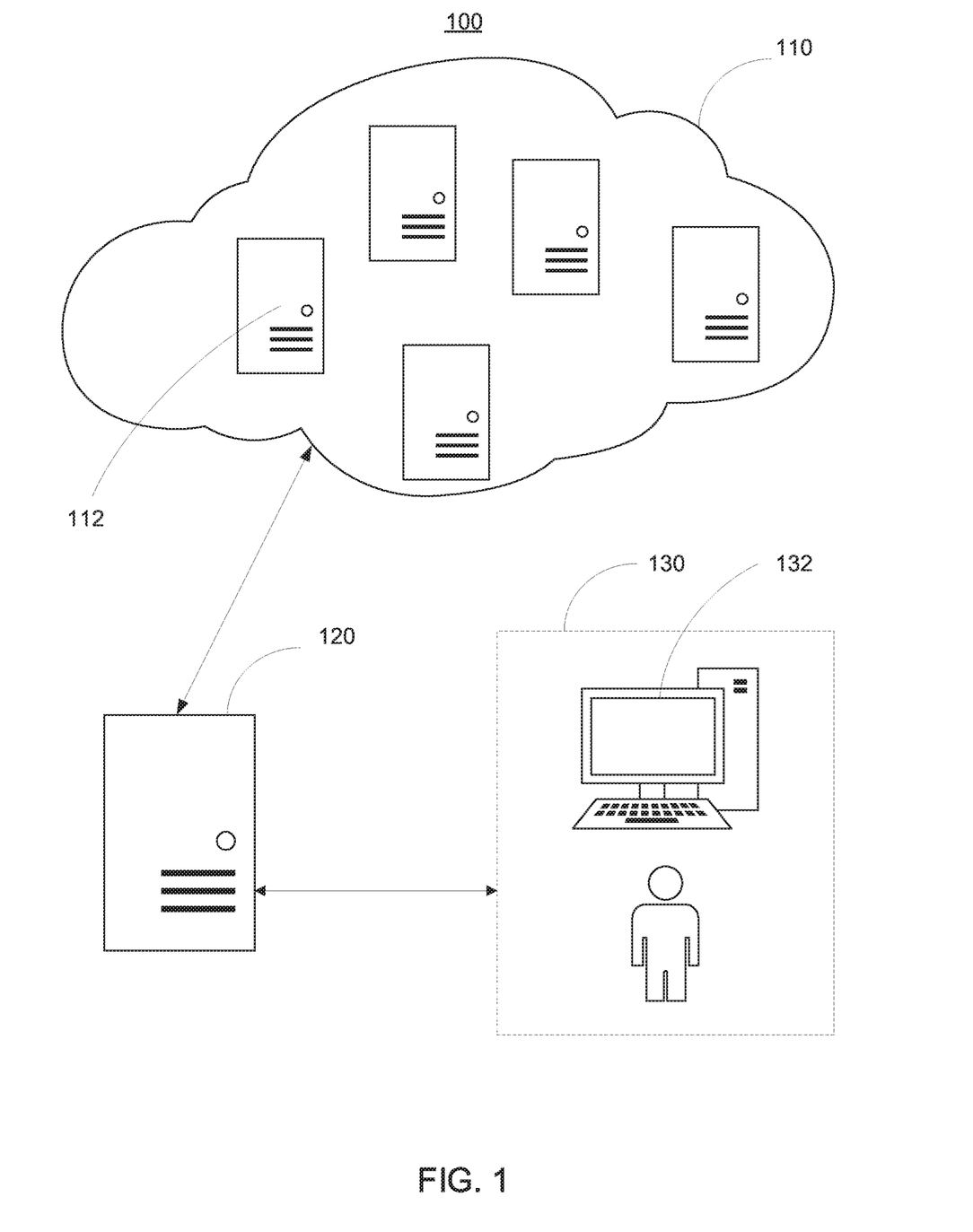
FIG. 1 is a block/flow diagram of a high-level overview of an online monitoring and analysis system, in accordance with an embodiment of the present invention.

Referring now in detail to the figures in which like numerals represent the same or similar elements and initially to FIG. 1, a block/flow diagram is provided illustrating a high-level overview of an online monitoring and analysis system 100. As shown, the system 100 includes a group 110 of computer systems 112, at least one processing device 120 and security applications 130. The group 110 can be monitored by agents. The at least one processing device 120 is shown in communication with the group 110 and the security applications 130 and can function as middleware. For example, the at least one processing device can function as big data processing middleware. The security applications 130 can include big data security applications. Further details regarding the operation of the security applications 130 will now be described in further detail below with reference to FIG. 2.

Figure 2:
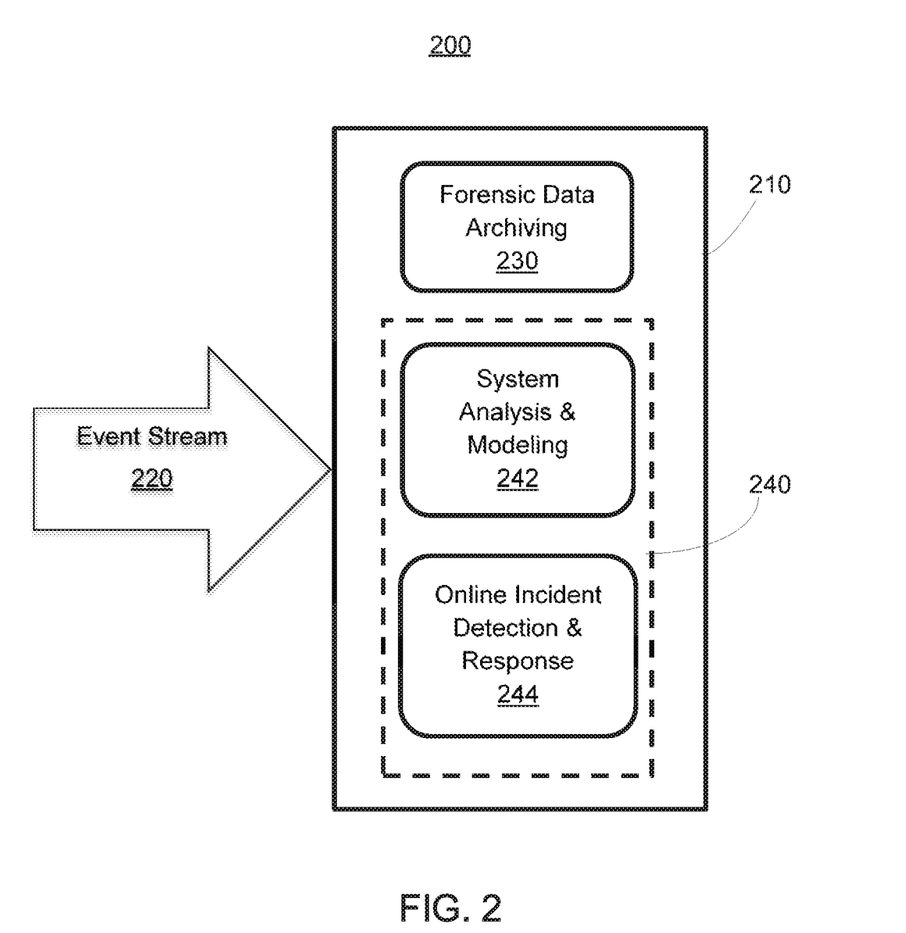
FIG. 2 is a block/flow diagram of a system/method for implementing security applications of the online monitoring and analysis system of FIG. 1, in accordance with an embodiment the present invention.

With reference to FIG. 2, a block/flow diagram is provided illustrating an exemplary system/method 200 for implementing security applications 210. The security applications 210 can be the same as the security applications 130 described above with reference to FIG. 1.

As shown, the security applications 130 can receive a computer system event stream ("event stream") 220 for processing.

The security applications 130 can include forensic data archiving component 230. The forensic data archiving component 230 can archive data from the event stream 220 over a prolonged period of time (e.g., months or years). The archived data can be used for, e.g., retroactive diagnosis or forensic evidence collections.

The security applications 130 can further include a set of ransomware detection components 240. More specifically, the set of ransomware detection components 240 can illustratively include a system analysis & modeling component 242 and an online incident detection & response component 244. Further details regarding the components 242 and 244 will be now described in further detail below with reference to FIG. 3.

Figure 3:
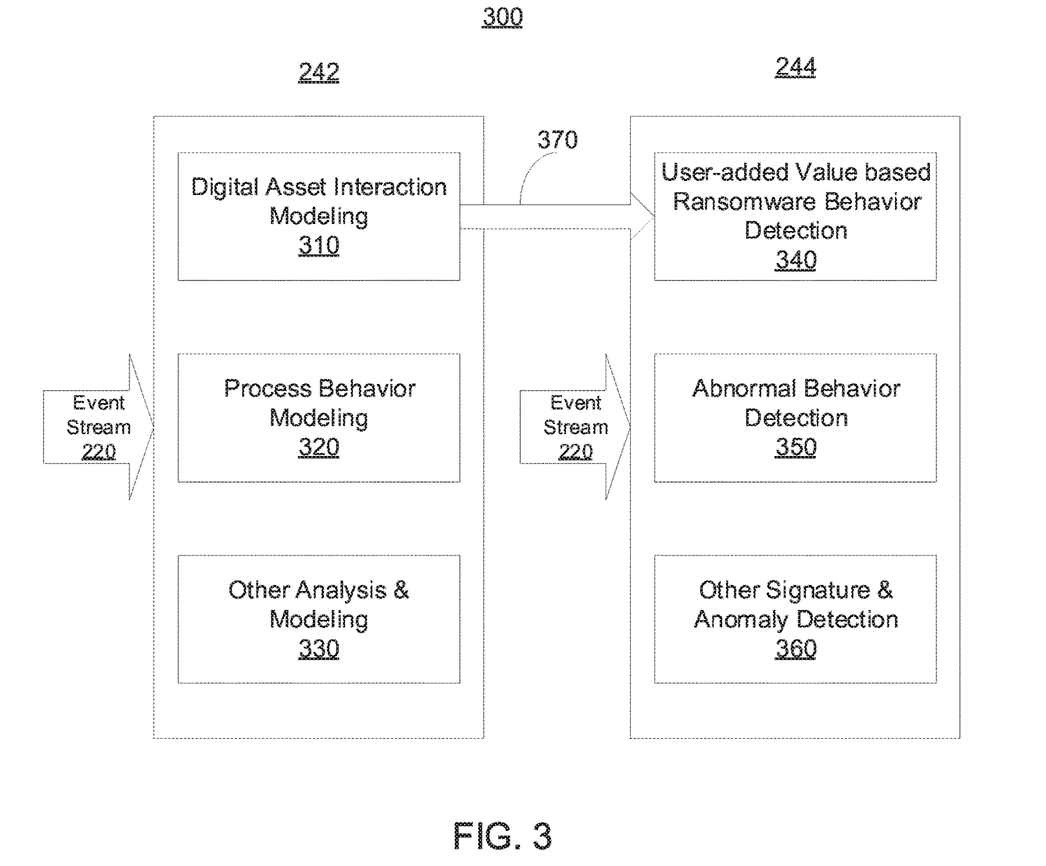
FIG. 3 is a block/flow diagram of a system/method for implementing system analysis & modeling and online incident detection & response associated with the security application of FIG. 2, in accordance with an embodiment of the present invention.

With reference to FIG. 3, a block/flow diagram is provided illustrating an exemplary system/method 300 for implementing a set of ransomware detection components including the system analysis & modeling component 242 and the online incident detection & response component 244 described above in FIG. 2. As shown, each of the components 242 and 244 can consume a separate stream of the event stream 220.

The system analysis & modeling component 242 can include a digital asset interaction modeling component 310, a process behavior modeling component 320, and other analysis & modeling component 330.

The online incident detection & response component 244 can include a user-added-value-based ransomware behavior detection component 340, an abnormal behavior detection component 350 and other signature & anomaly detection component 360.

The process behavior modeling component 320 can include functions that build and maintain knowledge of how benign processes access digital access (e.g. frequency distributions, thresholds). The produced model can be used to implement the functionality of the abnormal behavior detection component 350, such as, e.g., process-centric ransomware behavior detections.

The other analysis & modeling component 330 can include functions that extract, from the event stream 220, knowledge and information that benefit various other security detection functions of the other signature & anomaly detection component 360. For example, data and program hash signatures can be extracted by the other analysis & modeling component 330 for signature-based virus/malware detection in the other signature & anomaly detection component 360.

The digital asset interaction modeling component 310 can model digital asset interactions associated with at least one user. Further details regarding the digital asset interaction modeling component 310 will now be described below with reference to FIG. 4.

Figure 4:
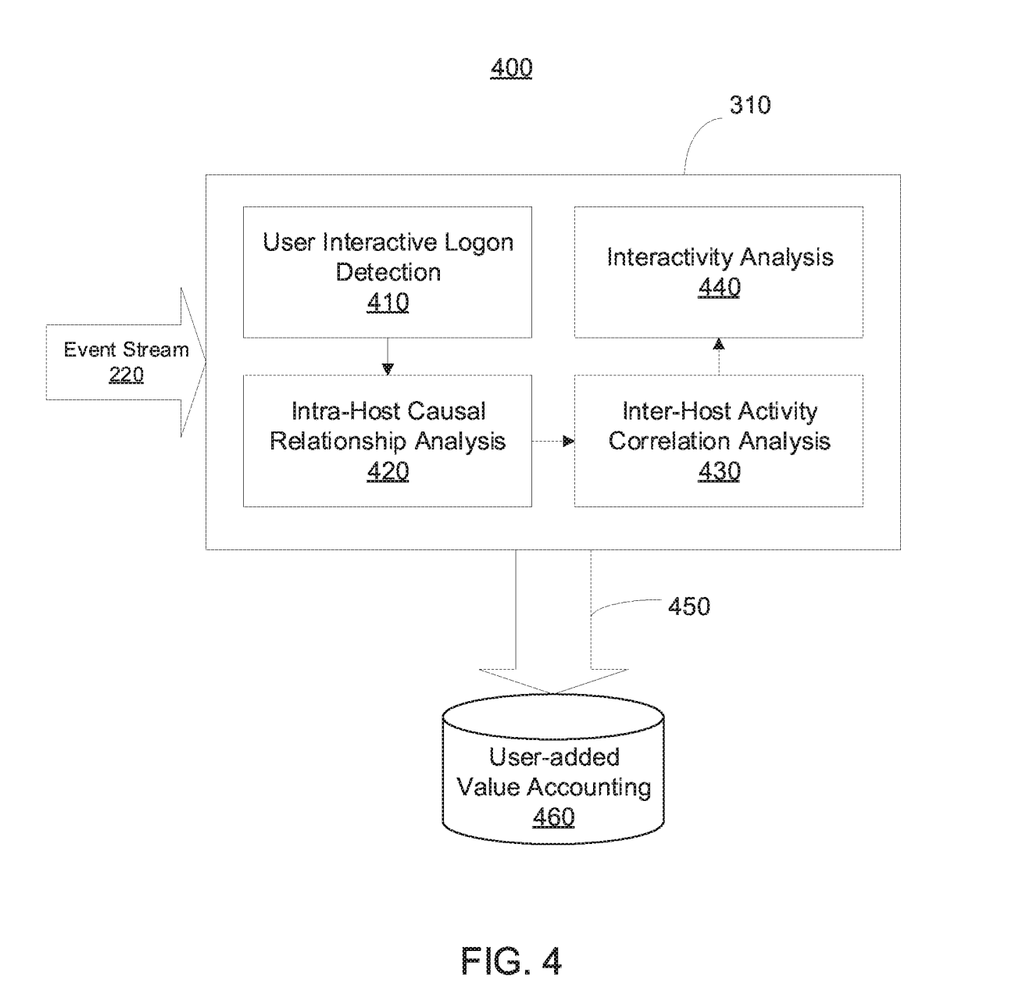
FIG. 4 is a block/flow diagram of a system/method illustrating details of digital asset interaction modeling performed during the system analysis & modeling of FIG. 3, in accordance with an embodiment of the present invention.

With reference to FIG. 4, a block/flow diagram is provided illustrating a system/method 400 for implementing the digital asset interaction modeling component 310. It can be assumed that a computer system associated with the digital asset interaction modeling component 310 can have multiple registered accounts, and can run multiple programs under different ones of the accounts. Additionally, not all of the accounts need to correspond to human users.

As shown, the digital asset interaction modeling component 310 can receive event stream 220, as described above with reference to FIGS. 2 and 3. The digital asset interaction modeling component 310 can include a user interactive logon detection component 410, an intra-host causal relationship analysis component 420, an inter-host activity correlation analysis component 430 and an interactivity analysis component 440.

An output 450 can be stored in a user-added-value accounting database 460. The output 450 can include digital interaction events obtained during the operation of components 410-440.

The user interactive logon detection component 410 can detect events that correspond to interactive user logon sessions based on analysis of the event stream 220. Detection methods that can be used by the user interactive logon detection component 410 can include, e.g., domain knowledge (e.g., execution of well-known interactive processes such as graphic desktop managers), authentication events (e.g., use of password and multi-factor authentications such as fingerprint/iris scan, facial/voice recognition, radio-frequency identification (RFID), etc.), and physical device activities (e.g., keyboard and mouse events).

Given a detected user interactive logon session ("user session") on a host computer system, the intra-host causal relationship analysis component 420 can track processes and their activities associated with the user session within the boundary of the host. Process tracking can include uncovering causal relationships between processes, and considering all causal-related processes associated with the user session. A causal relationship can be established by observing process creation events, during which a parent process can create a child process directly using system call. Alternatively, a process can leverage inter-process communication channels to request another process (e.g., operating system (OS) or third-party service) to create children processes indirectly on behalf of the requester. Such indirect causal relationships can be uncovered if the communication channels are monitored. Examples of direct process creation and indirect process creation will now be described with reference to FIG. 5.

Figure 5:
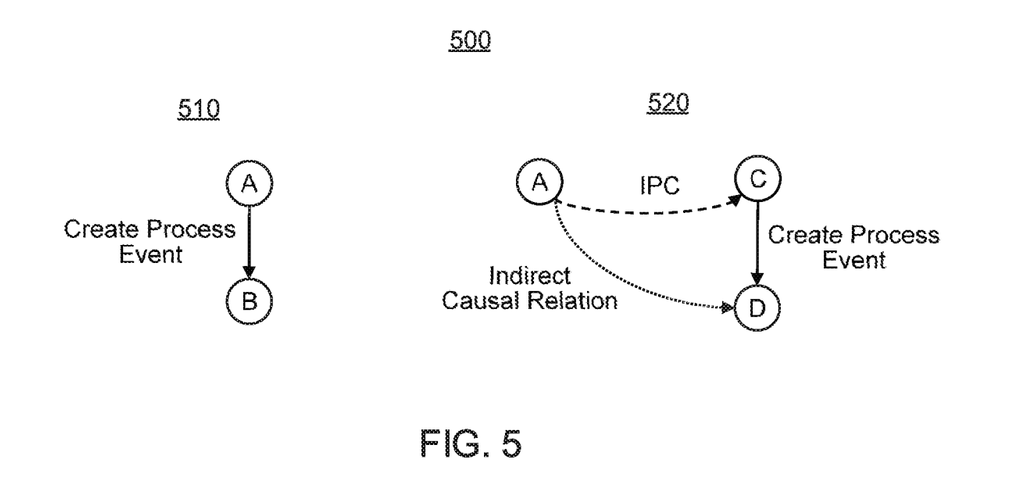
FIG. 5 is a diagram of process causal relationships, in accordance with an embodiment of the present invention.

With reference to FIG. 5, a diagram 500 is provided illustrating an example of a direct process creation 510 and indirect process creation 520.

As shown, during direct process creation 510, a parent process "A" can directly create a child process "B" via a create process event. For example, the parent process "A" can be e.g., an explorer.exe process, while the child process "B" can be, e.g., a notepad.exe process.

As further shown, during indirect process creation 520, a parent process "A" can indirectly create a child process "D". More specifically, the parent process "A" can communicate with a service host process "C" that uses a create process event to create the child process "D". The communication between the parent process "A" and the service host process "C" can include inter-process communication (IPC) via an IPC channel. For example, the parent process "A" can be, e.g., an explorer.exe process, the child process "D" can be, e.g., a winword.exe process, and the service host process "C" can be, e.g., an svchost.exe process.

Referring back to FIG. 4, the knowledge collected by the intra-host causal relationship analysis component 420 can be represented as a collection of user session activity graphs. Each of the user session activity graphs can include all of the processes that belong to a single user session on a single host, and accesses to digital assets on the host. Such information can be organizing as a tree or polytree, with all of the processes being internal nodes, all of the digital assets being leaf nodes, and the root(s) of the tree or polytree being the processes detected by the user interactive logon detection component 410. An example of a user session activity graph will now be described below with reference to FIG. 6.

Figure 6:
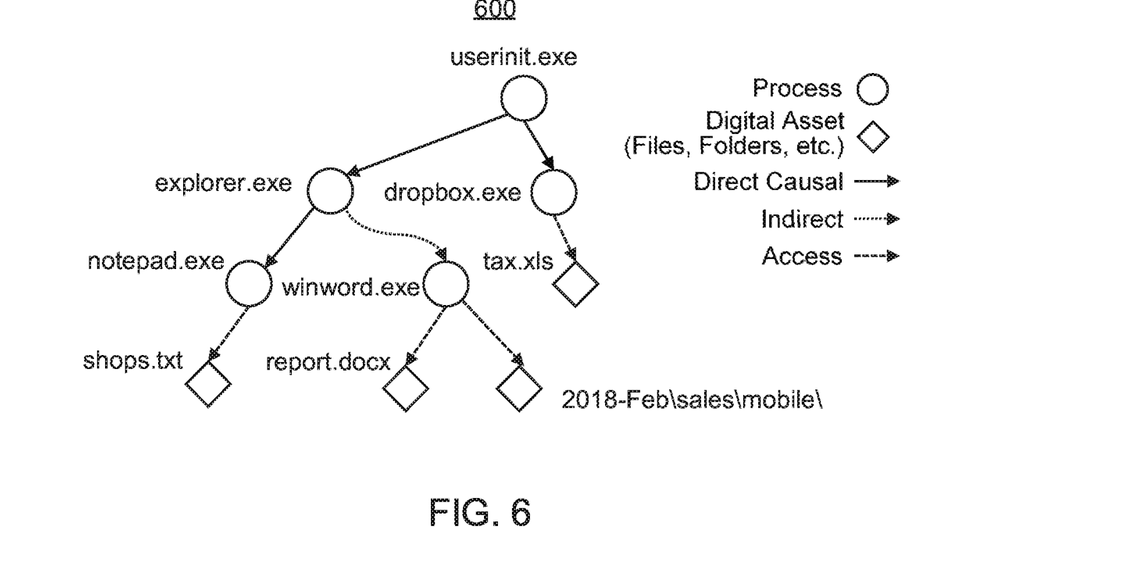
FIG. 6 is a diagram of a user session activity graph, in accordance with an embodiment of the present invention.

With reference to FIG. 6, a diagram is provided illustrating at least a portion of an exemplary user session activity graph 600. In this illustrative example, the interactive session can be associated with a user "John" with the host being "John-PC".

As shown, the graph 600 includes a plurality of internal nodes corresponding to circles that represent processes (e.g., userinit.exe, explorer.exe, dropbox.exe, notepade.exe, winword.exe, and tax.xls), a plurality of leaf nodes corresponding to diamonds that represent digital assets (e.g., shops.txt, report.docx and 2018-Feb\sales\mobile\), solid edges representing direct causal connections, dotted edges representing indirect causal connections, and dashed edges representing access to the digital assets.

Referring back to FIG. 4, during a logon session, a user may remotely logon to another host computer system, and perform interactive operations on the remote host. The inter-host activity correlation analysis component 430 can track user session process activities across multiple hosts, agnostic to their respective OS's. Methods of inter-host activity tracking can include application logs correlation and network event and timing correlations. Application logs correlation can work by relying on available application logs (e.g., web access logs) to link activities between two hosts. Network event and timing correlations can work by observing network traffic between two processes running on different hosts, and then inferring causal relationships of their other activities with close timing approximations. An example of network event and timing correlations will now be described with reference to FIG. 7.

Figure 7:
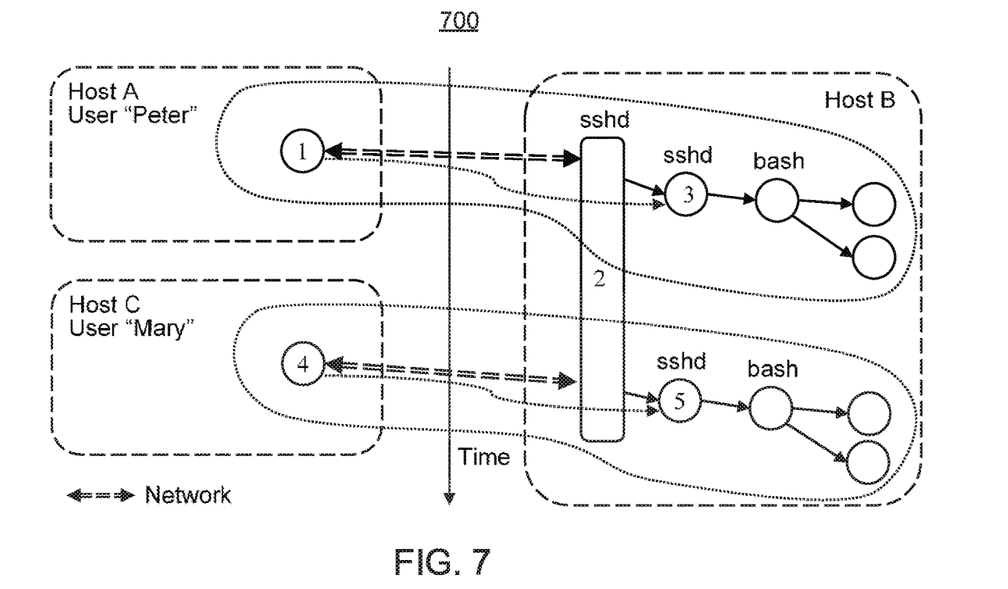
FIG. 7 is a diagram of an inter-host user session by network event and timing correlations, in accordance with an embodiment of the present invention.

With reference to FIG. 7, a diagram is provided illustrating an inter-host user session by network event and timing correlations 700. As shown, two user sessions on two different hosts A and C, associated with users Peter and Mary, respectively, make Secure Shell (SSH) connections to a third host B. For example, the Host A can run on a Windows® operating system, the Host C can run on a macOS® operating system and the Host B can run on a Linux® operating system.

For Peter's session, based on the network activities between process 1, which is an SSH process (e.g., PuTTY.exe), and process 2, which is an SSH service process or daemon (e.g., sshd), and the timing of the creation of process 3 (e.g., sshd), processes 1 and 3 are determined to have causal relationship, and thus belong to the same user session. The process 3 can be a parent of a subsequent child bash process. The child processes and activities of process 3 (e.g., the bash process) can be tracked in the same user session, such as by using an intra-host causal relationship analysis component (e.g., an intra-host causal relationship analysis component 420 described above with reference to FIG. 4).

Mary's session is similar to Peter's session, where process 4 is similar to process 1 and process 5 is similar to process 3.

Referring back to FIG. 4, the effect of the inter-host activity correlation analysis component 430 is that it basically expands the per-host user session activity graphs (e.g., output of the intra-host causal relationship analysis component 420) into larger, intra-host user session activity graphs. However, not all activities inside a user session are interactive. For example, some service processes or daemons and helper processes are known to automatically perform certain operations without any user involvement (e.g., software self-updates and periodic backups). While the digital assets involved may be valuable, these non-interactive activities can add little value to the digital assets (at least by themselves).

To address such non-interactive activities, interactivity analysis component 440 can operate as a filter that removes non-interactive activities from user session activity graphs. Filtering techniques that can be used include, but are not limited to, black/white list, statistical classifications (e.g., timing/entropy analyses), and machine learning based classifications.

The output 450 of the digital asset interaction modeling component 310 (e.g., the output of the interactivity analysis component 440) can include intra-host user session interactive activity graphs. Each activity graph of the output 450 can include interactive process-digital asset interactions that belong to a single user session, which can span one or more hosts.

The output 450 is provided to user-added-value accounting component 460. The user-added-value accounting component 460 can accumulate the user-added-values of each digital asset using user-added-value accounting. User-added-value accounting can be based on a variety of attributes and dimensions of the data. Examples of such attributes and dimensions of the data include, e.g.:

Cumulative duration of access (e.g., there is a direct relationship between access duration and digital asset value);

Type of access (e.g., content modifying operations (e.g. writing and appending) can contribute more to digital asset value than content consumption operations (e.g. reading and enumerating));

Content volume (e.g., for data of the same or similar type, larger data volume can have a greater digital asset value than smaller data volume, especially when the contrast is orders of magnitude (e.g. a 100 KB Word document contains 10-20 pages of text and graphics, a 2 KB Word document is empty). A logarithmic scale can be applied on this attribute to prevent, it from dominating the overall metric); and Intensity and regularity of access (e.g., intense access to a digital asset can increase the value of the digital asset over time, while sparse access to a digital asset can decrease the value of the digital asset over time. However, regular access can signify continued importance of the digital asset, and thus prevent value decay).

Referring back to FIG. 3, the user-digital asset interaction modeling component 310 can output user-added-value knowledge data 370 for digital assets, which can be produced by the user-added-value accounting component 460 described above with reference to FIG. 4. For a given digital asset, the user-added-value knowledge data 340 can include at least one of, e.g., (1) a digital asset identifier (e.g., pathname, a file system identifier, and universal resource identifier (URI)); (2) the accumulated user-added-value; (3) user accounts that contributed to the user-added-value; and (4) processes that are used to interactively access the digital asset.

The user-added-value knowledge data 370 is received by the user-added-value-based ransomware behavior detection component 340. The user-added-value-based ransomware behavior detection component 340 can then automatically detect ransomware behavior based on the user-added-value knowledge data 370. Further details regarding the operation of the user-added-value-based ransomware behavior detection component 340 will now be described with reference to FIG. 8.

Figure 8:
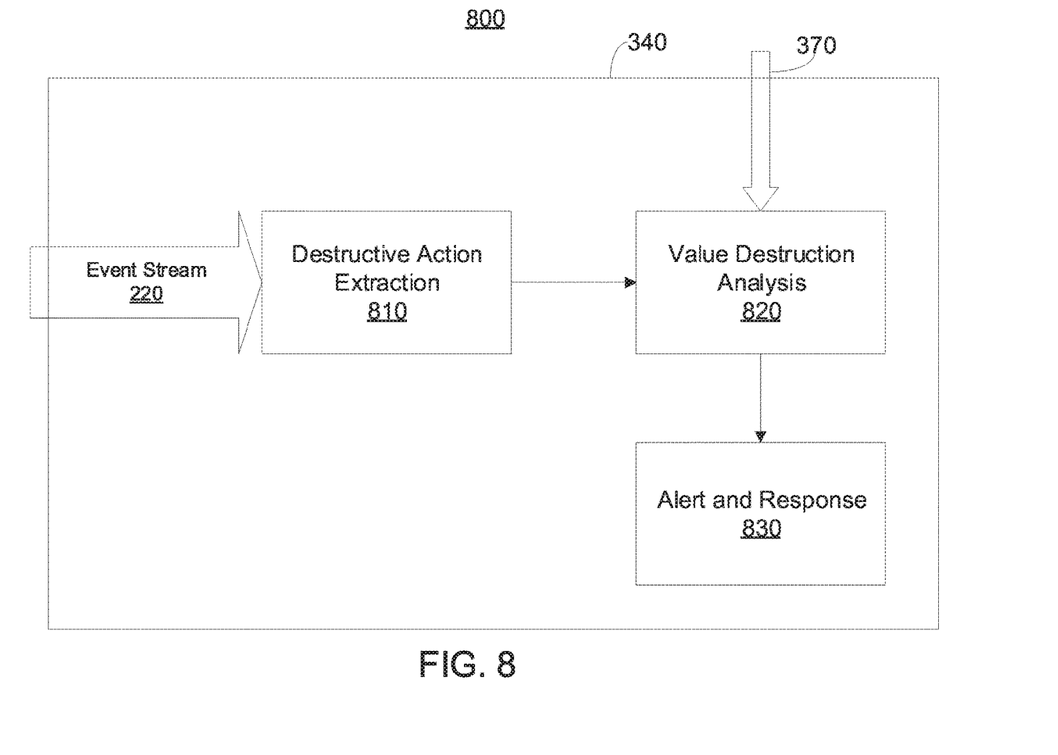
FIG. 8 is a block/flow diagram of a system/method illustrating details of user-added-value-based ransomware behavior detection performed during the online incident detection & response of FIG. 3, in accordance with an embodiment of the present invention.

With reference to FIG. 8, a block/flow diagram is provided illustrating a system/method 800 of user-added-value-based ransomware behavior detection using a user-added-value-based ransomware behavior detection component 340, as described above with reference to FIG. 3.

As shown, the user-added-value-based ransomware behavior detection component 340 can include a destructive action extraction component 810, a value destruction analysis component 820, and an alert and response component 830.

The destructive action extraction component 810 can receive and process the event stream 220 (as described above with reference to FIG. 2) to extract possible destructive actions. Extraction methods include, but are not limited to, detecting asset deletion, overwriting, and non-trivial transformations (e.g., encryption).

The value destruction analysis component 820 can combine the output of the destructive action extraction component (e.g., possible destructive actions) and the user-added-value knowledge data 370 (as described above with reference to FIG. 3) to analyze the destructions of user-added-values for all digital assets on each monitored host.

The alert and response component 830 can generate alerts and responses based on the analysis performed by the value destruction analysis component 820. For example, alerts can be flagged when patterns deviating from the norm are observed (e.g., in response to an identified destruction pattern anomaly).

Several threshold-based analyses can be used by the user-added-value-based ransomware behavior detection component 340. Examples of such threshold-based analyses include, e.g.:

Short-term destruction rate that maintains rolling time windows of accumulative destructed digital asset values on the order of minutes (1 minute, 5 minutes, 10 minutes, etc.) and can trigger detection when the accumulated values go above predefined thresholds and detection can be triggered when the accumulated values go above predefined thresholds (aim at detecting and responding to outbursts of ransomware);

Long-term destruction rate that is similar to the short-term destruction rate, except that it maintains rolling windows on the order of hours to days (3 hours, 12 hours, 1 day, etc.) (aims at detecting and responding to low-profile and stealthy ransomware); and Destruction pattern anomaly that uses machine learning to model normal pattern of the destruction of valuable digital assets, and flag alerts when observed patterns deviate from the norm (aims at detecting and responding to specialized ransomware such as, e.g., a targeted attack of a specific digital asset type).

Figure 9:
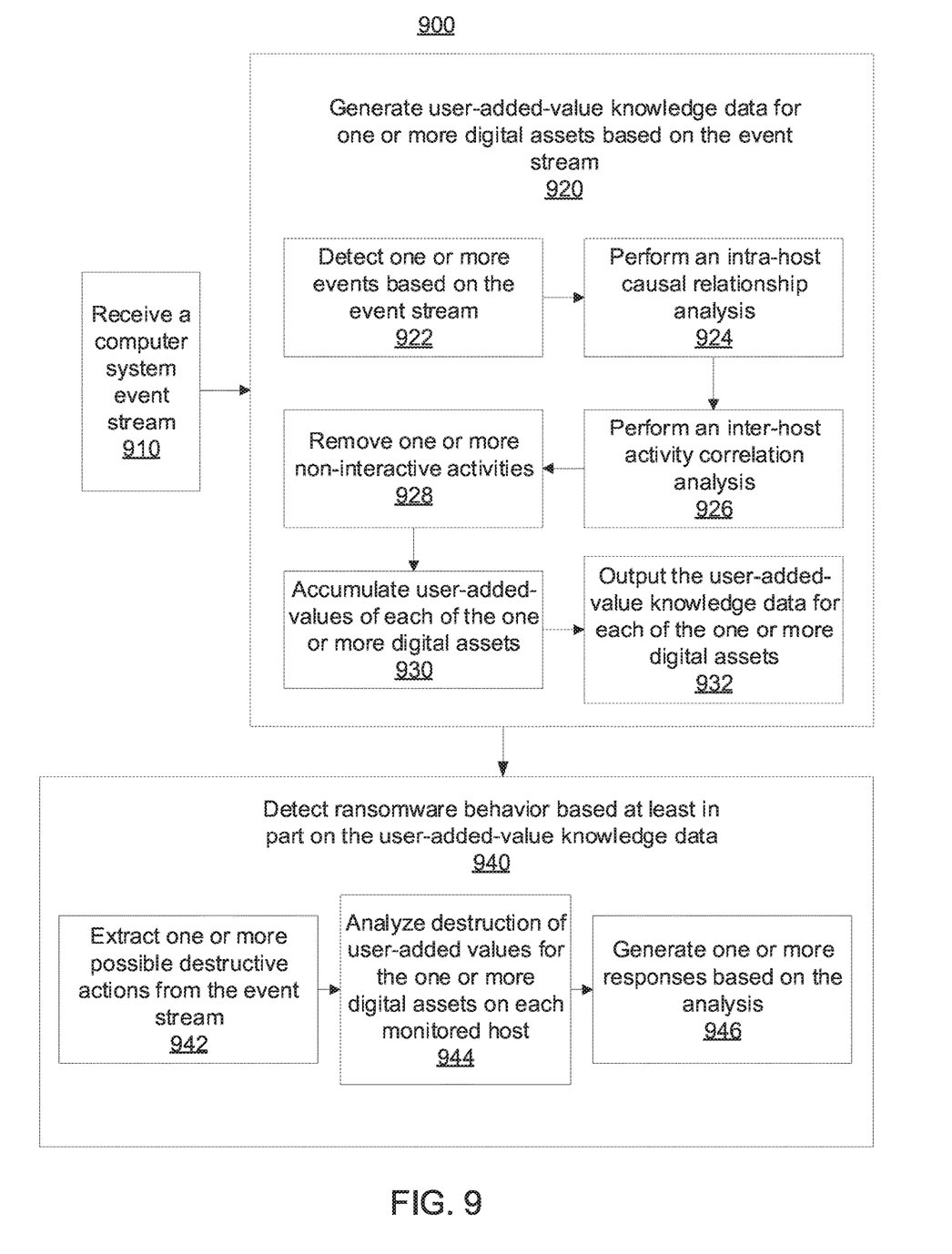
FIG. 9 is a block/flow diagram of a system method for ransomware detection and prevention, in accordance with an embodiment of the present invention.

With reference to FIG. 9, a block/flow diagram is provided illustrating a system/method 900 for ransomware detection and prevention.

At block 910, a computer system event stream ("event stream") is received. The event stream can include one or more computer system events. The event stream can be received by one or more security applications associated with an online monitoring and analysis system. More specifically, the event stream can be received by at least a set of ransomware detection components that can include a system analysis & modeling component and an online incident detection & response component. For example, each of the system analysis & modeling and online incident detection & response components can receive a separate stream of the event stream.

At block 920, user-added-value knowledge data for one or more digital assets is generated based on the event stream. Generating the user-added-value knowledge data can include performing digital asset interaction modeling based on the event stream.

For example, generating the user-added-value knowledge data can include, at block 922, detecting one or more events based on the event stream. The one or more events can correspond to one or more interactive user logon sessions. The one or more events can be detected based on, e.g., domain knowledge (e.g., execution of well-known interactive processes such as graphic desktop managers), authentication events (e.g., use of password and multi-factor authentications such as fingerprint/iris scan, facial/voice recognition, radio-frequency identification (RFID), etc.), and physical device activities (e.g., keyboard and mouse events).

Generating the user-added-value knowledge data can further include, at block 924, performing an intra-host causal relationship analysis. Performing the intra-host causal relationship analysis can include tracking processes associated with the user session within the boundary of the host, and can further include tracking activities associated with the processes. Process tracking can include uncovering causal relationships between the processes, and considering all causal-related processes associated with the user session. A causal relationship can be established by observing process creation events, during which a parent process can create a child process directly using system call. Alternatively, a process can leverage inter-process communication channels to request another process (e.g., OS or third-party service) to create children processes indirectly on behalf of the requester. Such indirect causal relationships can be uncovered if the communication channels are monitored.

Knowledge obtained at block 924 can be represented as one or more user session activity graphs. Each of the one or more user session activity graphs can include all of the processes that belong to a single user session on a single host, and accesses to digital assets on the host. Such information can be organizing as a tree or polytree, with all of the processes being internal nodes, all of the digital assets being leaf nodes, and the root(s) of the tree or polytree being the detected or tracked processes.

Generating the user-added-value knowledge data can further include, at block 926, performing an inter-host activity correlation analysis. The inter-host activity correlation analysis can be performed in response to the user remotely logging onto at least one other host computer system (e.g., at least one remote host) and performing interactive operations on the at least one other host computer system.

The inter-host activity correlation analysis performed at block 926 can include tracking one or more user session process activities across multiple hosts. The tracking can be based on application logs correlation and network event and timing correlations. Application logs correlation can work by relying on available application logs (e.g., web access logs) to link activities between two hosts. Network event and timing correlations can work by observing network traffic between two processes running on different hosts, and then inferring causal relationships of their other activities with close timing approximations.

The inter-host activity correlation analysis performed at block 926 can expand the per-host user session activity graphs into larger intra-host user session activity graphs. However, not all activities inside a user session are interactive. For example, some service processes or daemons and helper processes are known to automatically perform certain operations without any user involvement (e.g., software self-updates and periodic backups). While the digital assets involved may be valuable, these non-interactive activities can add little value to the digital assets (at least by themselves).

To address such non-interactive activities, generating the user-added-value knowledge data can further include, at block 928, removing one or more non-interactive activities. Removing the one or more non-interactive activities can include removing the one or more non-interactive activities from the one or more user session activity graphs. Removing the one or more non-interactive activities can include performing one or more filtering techniques. Examples of filtering techniques include, but are not limited to, black/white list, statistical classifications (e.g., timing/entropy analyses), and machine learning based classifications. The output of block 928 can include one or more intra-host user session interactive activity graphs.

Generating the user-added-value knowledge data can further include, at block 930, accumulating user-added-values of each of the or more digital assets. The accumulation at block 930 can be performed using user-added-value accounting. User-added-value accounting can be based on a variety of attributes and dimensions of the data. Examples of attributes and dimension of the data include, but are not limited to, cumulative duration of access, type of access, content volume, intensity and regularity of access, etc.

Generating the user-add value knowledge data can further include, at block 932, outputting the user-added-value knowledge data for each of the one or more digital assets. The user-added-value knowledge data for each of the one or more digital assets can include at least one of, e.g., (1) a digital asset identifier (e.g., pathname, a file system identifier, and URI); (2) the accumulated user-added value; (3) user accounts that contributed to the user-added value; and (4) processes that are used to interactively access the digital asset.

At block 940, ransomware behavior is detected based at least in part on the user-added-value knowledge data. In one embodiment, the ransomware behavior can be detected (e.g., automatically detected) based on the output user-added-value knowledge data and the event stream.

For example, detecting the ransomware behavior can include, at block 942, extract one or more possible destructive actions from the event stream. Extraction methods include, but are not limited to, detecting asset deletion, overwriting, and non-trivial transformations (e.g., encryption).

Detecting the ransomware behavior can further include, at block 944, analyzing destruction of user-added-values for the one or more digital assets on each monitored host. Analyzing the destruction of user-added-values can include combining the one or more possible destructive actions and the output user-added-value knowledge data.

Detecting the ransomware behavior can further include, at block 946, generating one or more responses based on the analysis. For example, the ransomware can be "frozen" to prevent the ransomware from doing more damage. In addition, one or more alerts can be flagged when patterns deviating from the norm are observed (e.g. in response to an identified destruction pattern anomaly.

Several threshold-based analyses can be used to detect the ransomware behavior. Examples of such threshold-based analysis include, but are not limited to, short-term destruction rate, long-term destruction rate, destruction pattern anomaly, etc.

Further details regarding blocks 920-946 are described above with reference to FIGS. 1-8.

By its very nature, ransomware need not have a unique signature as found in other types of malware, since ransomware does not need to exploit anything or do anything out-of-the-line (extra abilities could help ransomware propagate faster, but are not strictly required, and simple social engineering can go a long way). However, since the embodiments described herein focus on user behavior, as opposed to the ransomware itself, the embodiments described herein can improve speed and accuracy in detecting ransomware activities.

The embodiments described herein can generate fewer false positive alerts triggered by destructive, non-ransomware behaviors (e.g., batch deletion of many system logs or application of large system updates), since the detections made in accordance with the embodiments described herein are generally unaffected by digital assets with small user-added-values.

Additionally, by differentiating digital assets with different user-added-values, the embodiments described herein can focus on digital assets that have bigger impacts to users, thereby increasing detection sensitivity and providing faster detections in the event of true alerts (e.g., destruction of a very small number of high value assets could immediately trigger protection, in contrast to having to wait for a statistical threshold or tripping a decoy file, by when many more important assets could have been destroyed). This could reduce or eliminate damage caused by ransomware.

To illustrate how the embodiments described herein can detect and prevent ransomware attacks, an illustrative use-case scenario will now be described.

Assume that Alice is an accountant of a middle-sized company. It is close to the end of the fiscal year, and Alice has to prepare a report of the transactions of the company for the current year. Alice's computer has recent been upgraded, with years of historical documents backed up in a mobile drive (e.g., offline). Alice has only restored 5 files from the backup to complete this task: last year's report and the 4 quarterly reports for the current year. Accordingly, Alice's computer includes 6 files relating to the report preparation, including the 5 files from the backup and the work-in-progress (WIP) file corresponding to the current year's report.

Alice has spent 80 hours preparing the current year's report. As she is finishing up the current year's report, Alice receives an urgent e-mail that appears to be from her supervisor. The e-mail demands that Alice immediately open and read the attached document. It turns out that the e-mail is a spear-phishing e-mail including a ransomware attachment. Unaware of the malicious nature of the e-mail, Alice followed the e-mail instructions and activated the ransomware attachment, which proceeded to encrypt Alice's documents.

Since Alice's computer only included 6 files relating to the report preparation, the overwrite/delete behavior of the ransomware may not have been able to trigger a conventional ransomware detection and prevention technique configured to generate an alert when a threshold number of digital assets are deleted (e.g., at least 50 digital assets). Therefore, such a conventional ransomware detection and prevention technique would not have been able to prevent the complete destruction of Alice's work, and the loss of 80+ hours of work.

However, using the ransomware detection and prevention techniques in accordance with the embodiments described herein, knowledge of the user-added-values of the 6 files can be obtained from prior monitoring of Alice's interaction with the 6 files. For example, it can be determined that 80 hours were spent preparing both last year's report and the current year's report, and 30 hours were spent preparing the 4 quarterly reports for the current year. Thus, when the ransomware starts to overwrite/delete the 6 files, ransomware detection and prevention techniques described herein can discover that an unusually large amount of user-added-value is being destroyed. More specifically, the ransomware detection and prevention techniques described herein can generate an alert when a threshold number of hours' worth of digital assets are destroyed.

For example, if the ransomware deleted last year's report and the reports for the first 2 quarters for the current year, the total destroyed user-added-value already accumulated to 140 hours (80 hours+30 hours+30 hours). If the threshold number of hours' worth of digital assets is set to 120 hours, the ransomware detection and prevention techniques described herein can detect the presence of the ransomware, and can "freeze" the ransomware to prevent the ransomware from doing any more damage. In addition, an alert can be generated to Alice for confirmation, and Alice can respond by saving the work she has done preparing the current year's report.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
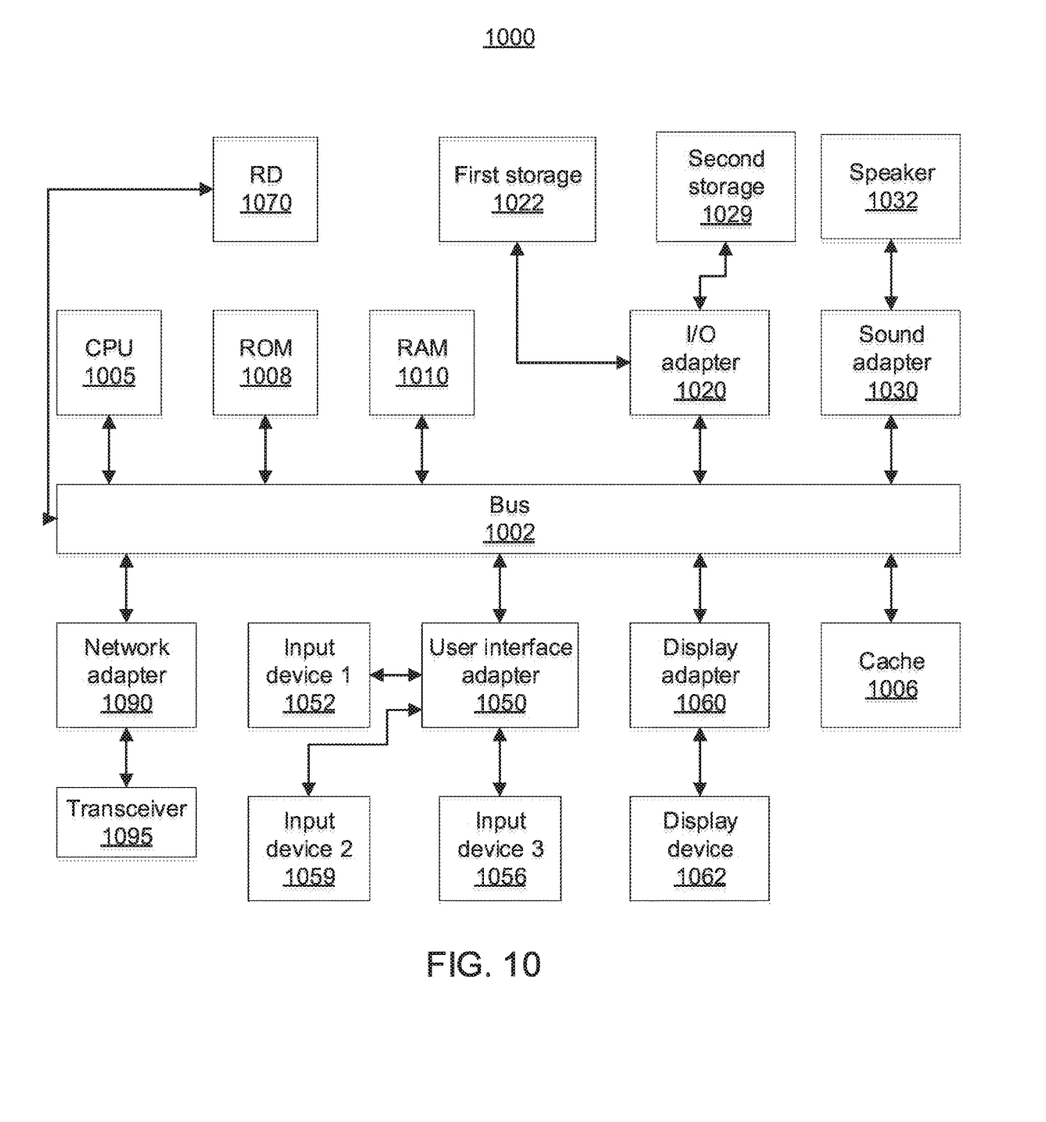
FIG. 10 is a block/flow diagram illustrating a computer system, in accordance with the present principles.

Referring now to FIG. 10, an exemplary computer system 1000 is shown which may represent a server or a network device, in accordance with an embodiment of the present invention. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1090, a user interface adapter 1050, and a display adapter 1060, are operatively coupled to the system bus 1002.

A first storage device 1022 and a second storage device 1029 are operatively coupled to system bus 1002 by the I/O adapter 1020. The storage devices 1022 and 1029 can be any of a disk storage device (e.g., a magnetic or optical disk storage device), a solid state magnetic device, and so forth. The storage devices 1022 and 1029 can be the same type of storage device or different types of storage devices.

A speaker 1032 may be operatively coupled to system bus 1002 by the sound adapter 1030. A transceiver 1095 is operatively coupled to system bus 1002 by network adapter 1090. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1052, 1059, and 1056 can be the same type of user input device or different types of user input devices. The user input devices 1052, 1059, and 1056 are used to input and output information to and from system 1000.

Ransomware detection (RD) component 1070 may be operatively coupled to system bus 1002. RD component 1070 is configured to perform one or more of the operations described above. RD component 1070 can be implemented as a standalone special purpose hardware device, or may be implemented as software stored on a storage device. In the embodiment in which RD component 1070 is software-implemented, although shown as a separate component of the computer system 1000, RD component 1070 can be stored on, e.g., the first storage device 1022 and/or the second storage device 1029. Alternatively, RD component 1070 can be stored on a separate storage device (not shown).

Of course, the computer system 1000 may also include other elements (not shown), as readily contemplated by one of skill in the art, as well as omit certain elements. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for ransomware detection and prevention, comprising:

receiving an event stream associated with one or more computer system events;

generating user-added-value knowledge data for one or more digital assets by modeling digital asset interactions based on the event stream, including accumulating user-added-values of each of the one or more digital assets, wherein generating the user-added-value knowledge data further includes:

detecting one or more events corresponding to one or more interactive user logon sessions based on the event stream;

performing an intra-host causal relationship analysis to obtain one or more user session activity graphs by tracking processes associated with at least one user session, and uncovering causal relationships between the tracked processes; and performing an inter-host activity correlation analysis based on interactive operations performed by a user remotely logged onto at least one other host computer system, including tracking user session process activities across multiple hosts; and detecting ransomware behavior based at least in part on the user-added-value knowledge, including analyzing destruction of the user-added values for the one or more digital assets.

2. The method of claim 1, wherein generating the user-added-value knowledge data further includes removing one or more non-interactive activities from the one or more user session activity graphs.

3. The method of claim 1, further comprising extracting one or more possible destructive actions from the event stream, wherein analyzing the destruction of the user-added-values for the one or more digital assets further includes combining the one or more possible destruction actions and the user-added-value knowledge data.

4. The method of claim 1, further comprising generating one or more responses based on the detection of ransomware behavior.

5. A computer program product comprising a non-transitory computer readable storage medium having program instructions embodied therewith, the program instructions executable by a computer to cause the computer to perform a method for ransomware detection and prevention, the method performed by the computer comprising:

receiving an event stream associated with one or more computer system events;

generating user-added-value knowledge data for one or more digital assets by modeling digital asset interactions based on the event stream, including accumulating user-added-values of each of the one or more digital assets, wherein generating the user-added-value knowledge data further includes:

detecting one or more events corresponding to one or more interactive user logon sessions based on the event stream;

performing an intra-host causal relationship analysis to obtain one or more user session activity graphs by tracking processes associated with at least one user session, and uncovering causal relationships between the tracked processes; and         performing an inter-host activity correlation analysis based on interactive operations performed by a user remotely logged onto at least one other host computer system, including tracking user session process activities across multiple hosts; and     detecting ransomware behavior based at least in part on the user-added-value knowledge, including analyzing destruction of the user-added values for the one or more digital assets.

6. The computer program product of claim 5, wherein generating the user-added-value knowledge data further includes removing one or more non-interactive activities from the one or more user session activity graphs.

7. The computer program product of claim 5, wherein the method further includes extracting one or more possible destructive actions from the event stream, wherein analyzing the destruction of the user-added-values for the one or more digital assets further includes combining the one or more possible destruction actions and the user-added-value knowledge data.

8. The computer program product of claim 5, further comprising generating one or more responses based on the detection of ransomware behavior.

9. A system for ransomware detection and prevention, comprising:

a memory device for storing program code; and at least one processor device operatively coupled to a memory device and configured to execute program code stored on the memory device to:

receive an event stream associated with one or more computer system events;

generate user-added-value knowledge data for one or more digital assets by modeling digital asset interactions based on the event stream by accumulating user-added-values of each of the one or more digital assets, wherein generating the user-added-value knowledge data further includes:

detecting one or more events corresponding to one or more interactive user logon sessions based on the event stream;

performing an intra-host causal relationship analysis to obtain one or more user session activity graphs by tracking processes associated with at least one user session, and uncovering causal relationships between the tracked processes; and         performing an inter-host activity correlation analysis based on interactive operations performed by a user remotely logged onto at least one other host computer system, including tracking user session process activities across multiple hosts; and     detect ransomware behavior based at least in part on the user-added-value knowledge by analyzing destruction of the user-added values for the one or more digital assets.

10. The system of claim 9, wherein the at least one processor is further configured to generate the user-added-value knowledge data by removing one or more non-interactive activities from the one or more user session activity graphs.

11. The system of claim 9, wherein the at least one processor device is further configured to extract one or more possible destructive actions from the event stream, wherein the at least one processor is further configured to analyze the destruction of the user-added-values for the one or more digital assets by combining the one or more possible destruction actions and the user-added-value knowledge data.

12. The system of claim 9, wherein the at least one processor device is further configured to generate one or more responses based on the detection of ransomware behavior.

\* \* \* \* \*